(12) United States Patent
Xu et al.

(10) Patent No.: US 7,396,611 B2
(45) Date of Patent: Jul. 8, 2008

(54) FUEL CELL CATALYST LAYER

(75) Inventors: Zhiqiang Xu, Bloomfield, NJ (US); Zhigang Qi, North Arlington, NJ (US); Arthur Kaufman, West Orange, NJ (US)

(73) Assignee: Plug Power Inc., Latham, NY (US)

( * ) Notice: Subject to any disclaimer, the term of this patent is extended or adjusted under 35 U.S.C. 154(b) by 576 days.

(21) Appl. No.: 10/736,172

(22) Filed: Dec. 15, 2003

(65) Prior Publication Data

US 2005/0130027 A1 Jun. 16, 2005

(51) Int. Cl.
*H01M 8/08* (2006.01)

(52) U.S. Cl. .............................. 429/46; 429/12; 429/34

(58) Field of Classification Search ................... 429/12, 429/34, 46
See application file for complete search history.

(56) References Cited

U.S. PATENT DOCUMENTS

| | | | |
|---|---|---|---|
| 3,637,424 A | 1/1972 | Miller | |
| 4,166,143 A | 8/1979 | Petrow et al. | |
| 4,175,165 A | 11/1979 | Adlhart | |
| 4,876,115 A | 10/1989 | Raistrick | |
| RE33,149 E | 1/1990 | Petrow et al. | |
| 5,132,193 A | 7/1992 | Reddy et al. | |
| 5,211,984 A | 5/1993 | Wilson | |
| 5,501,915 A | 3/1996 | Hards et al. | |
| 5,648,307 A | 7/1997 | Yasuda et al. | |
| 5,723,173 A | 3/1998 | Fukuoka et al. | |
| 5,728,485 A | 3/1998 | Watanabe et al. | |
| 5,882,810 A | 3/1999 | Mussell et al. | |
| 6,042,643 A * | 3/2000 | Belmont et al. | 406/472 |
| 6,153,323 A | 11/2000 | Colbow et al. | |
| 6,258,476 B1 | 7/2001 | Cipollini | |
| 6,309,772 B1 | 10/2001 | Zuber et al. | |
| 6,746,793 B1 * | 6/2004 | Gyoten et al. | 429/40 |
| 6,797,422 B2 * | 9/2004 | Fan et al. | 429/34 |
| 2001/0031387 A1 | 10/2001 | Takeda et al. | |
| 2002/0071980 A1 | 6/2002 | Tabata et al. | |
| 2002/0197522 A1 * | 12/2002 | Lawrence et al. | 429/34 |
| 2003/0022055 A1 * | 1/2003 | Menashi | 429/44 |
| 2003/0157397 A1 | 8/2003 | Barton et al. | |
| 2003/0198860 A1 | 10/2003 | Yasumoto et al. | |
| 2004/0241078 A1 | 12/2004 | Inoue et al. | |
| 2005/0074727 A1 | 4/2005 | Kiefer et al. | |

FOREIGN PATENT DOCUMENTS

| | | |
|---|---|---|
| EP | 0791974 | 8/1997 |
| WO | 00/24073 | 4/2000 |
| WO | 2003/034519 | 4/2004 |

OTHER PUBLICATIONS

Kinoshita, "Chemically Modified Electrodes." in: *Carbon* (New York, John Wiley & Sons, 1988), pp. 239-251.

(Continued)

*Primary Examiner*—Patrick Ryan
*Assistant Examiner*—Cynthia K. Lee
(74) *Attorney, Agent, or Firm*—Fish & Richardson P.C.

(57) ABSTRACT

Fuel cell catalyst layers, and related systems and methods are disclosed.

33 Claims, 7 Drawing Sheets

OTHER PUBLICATIONS

Kinoshita, "Preparation of Electrocatalysts Supported on Carbon." and "Fuel Cells." in: Carbon (New York, John Wiley & Sons, 1998), pp. 388-403 and 453-457.

Kinoshita, "Concluding Remarks" in: Carbon (New York, John Wiley & Sons, 1998), pp. 469-475.

Poltarzewski et al., "Nafion Distribution in Gas Diffusion Electrodes for Solid-Polymer-Electrolite-Fuel-Cell Applications," *J. Electrochem. Soc.*, 139(3):761-765 (1992).

Ticianelli et al., "Methods to Advance Technology of Proton Exchange Membrane Fuel Cells," *J. Electrochem. Soc.*, 135(9):2209-2214 (1988).

* cited by examiner

FUEL CELL CATALYST LAYER

TECHNICAL FIELD

The invention relates to fuel cell catalyst layers, and related systems and methods.

BACKGROUND

A fuel cell can convert chemical energy to electrical energy by promoting electrochemical reactions of two reactants.

One type of fuel cell includes a cathode flow field plate, an anode flow field plate, a membrane electrode assembly disposed between the cathode flow field plate and the anode flow field plate, and diffusion layers disposed between the cathode flow field plate and the anode flow field plate. A fuel cell can also include one or more coolant flow field plates disposed adjacent the exterior of the anode flow field plate and/or the exterior of the cathode flow field plate.

Each reactant flow field plate has an inlet region, an outlet region and open-faced channels connecting the inlet region to the outlet region and providing a way for distributing the reactants to the membrane electrode assembly.

The membrane electrode assembly usually includes a solid electrolyte (e.g., a proton-exchange membrane) between a first catalyst and a second catalyst. One diffusion layer is between the first catalyst and the anode flow field plate, and another diffusion layer is between the second catalyst and the cathode flow field plate.

During operation of the fuel cell, one of the reactants (the anode reactant) enters the anode flow field plate at the inlet region of the anode flow field plate and flows through the channels of the anode flow field plate toward the outlet region of the anode flow field plate. The other reactant (the cathode reactant) enters the cathode flow field plate at the inlet region of the cathode flow field plate and flows through the channels of the cathode flow field plate toward the cathode flow field plate outlet region.

As the anode reactant flows through the channels of the anode flow field plate, some of the anode reactant passes through the anode diffusion layer and interacts with the anode catalyst. Similarly, as the cathode reactant flows through the channels of the cathode flow field plate, some of the cathode reactant passes through the cathode diffusion layer and interacts with the cathode catalyst.

The anode catalyst interacts with the anode reactant to catalyze the conversion of the anode reactant to reaction intermediates. The reaction intermediates include ions and electrons. The cathode catalyst interacts with the cathode reactant and the anode reaction intermediates to catalyze the conversion of the cathode reactant to the chemical product of the fuel cell reaction.

The chemical product of the fuel cell reaction flows through a diffusion layer to the channels of a flow field plate (e.g., the cathode flow field plate). The chemical product then flows along the channels of the flow field plate toward the outlet region of the flow field plate.

The electrolyte provides a barrier to the flow of electrons and reactants from one side of the membrane electrode assembly to the other side of the membrane electrode assembly. However, the electrolyte allows ionic reaction intermediates (e.g., protons) to flow from the anode side of the membrane electrode assembly to the cathode side of the membrane electrode assembly.

Therefore, the ionic reaction intermediates can flow from one side of the membrane electrode assembly to the other side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate, and the cathode side of the membrane electrode assembly.

Because electrons are formed at the anode side of the membrane electrode assembly, the anode reactant undergoes oxidation during the fuel cell reaction. Because electrons are consumed at the cathode side of the membrane electrode assembly, the cathode reactant undergoes reduction during the fuel cell reaction.

For example, when molecular hydrogen and molecular oxygen are the reactants used in a fuel cell, the molecular hydrogen flows through the anode flow field plate and undergoes oxidation. The molecular oxygen flows through the cathode flow field plate and undergoes reduction. The specific reactions that occur in the fuel cell are represented in equations 1-3.

$$H_2 \rightarrow 2H^+ + 2e^- \tag{1}$$

$$\tfrac{1}{2}O_2 + 2H^+ + 2e^- \rightarrow H_2O \tag{2}$$

$$H_2 + \tfrac{1}{2}O_2 \rightarrow H_2O \tag{3}$$

As shown in equation 1, the molecular hydrogen forms protons ($H^+$) and electrons. The protons flow through the electrolyte to the cathode side of the membrane electrode assembly, and the electrons flow from the anode side of the membrane electrode assembly to the cathode side of the membrane electrode assembly through the external load. As shown in equation 2, the electrons and protons react with the molecular oxygen to form water. Equation 3 shows the overall fuel cell reaction.

In addition to forming chemical products, the fuel cell reaction produces heat. One or more coolant flow field plates are typically used to conduct the heat away from the fuel cell and prevent it from overheating.

Each coolant flow field plate has an inlet region, an outlet region and channels that provide fluid communication between the coolant flow field plate inlet region and the coolant flow field plate outlet region. A coolant (e.g., liquid de-ionized water) at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

To increase the electrical energy available, a plurality of fuel cells can be arranged in series to form a fuel cell stack. In a fuel cell stack, one side of a flow field plate functions as the anode flow field plate for one fuel cell while the opposite side of the flow field plate functions as the cathode flow field plate in another fuel cell. This arrangement may be referred to as a bipolar plate. The stack may also include monopolar plates such as, for example, an anode coolant flow field plate having one side that serves as an anode flow field plate and another side that serves as a coolant flow field plate. As an example, the open-faced coolant channels of an anode coolant flow field plate and a cathode coolant flow field plate may be mated to form collective coolant channels to cool the adjacent flow field plates forming fuel cells.

SUMMARY

In one aspect, the invention features a fuel cell catalyst layer that includes carbon-containing particles and a moiety covalently bound to the carbon-containing particles. The hydrophobicity of the fuel cell catalyst layer is greater than the hydrophobicity of the carbon-containing particles.

In another aspect, the invention features a fuel cell system that includes two fuel cell flow plates, an electrolyte between the fuel cell flow plates, and a fuel cell catalyst layer between the electrolyte and one of the flow plates. The fuel cell catalyst layer includes carbon-containing particles and a moiety covalently bound to the carbon-containing particles. The hydrophobicity of the fuel cell catalyst layer is greater than the hydrophobicity of the carbon-containing particles.

In a further aspect, the invention features a method of making a fuel cell catalyst layer. The method includes covalently bonding carbon-containing particles with a moiety to provide the fuel cell catalyst layer. The hydrophobicity of the fuel cell catalyst layer is greater than the hydrophobicity of the carbon-containing particles.

As used hereinafter, the term "alkyl moiety" refers to a saturated hydrocarbon chain that may be a straight chain or branched chain. In general, the number of carbon atoms in an alkyl moiety can be varied as desired (e.g., one to ten carbon atoms, one to six carbon atoms, one to three carbon atoms). An alkyl moiety can be substituted (e.g., substituted with one or more halogens) or unsubstituted.

As used hereinafter, the term "halogen" refers to fluorine, chlorine, bromine or iodine.

As used hereinafter, the term "alkenyl moiety" refers to a hydrocarbon chain having at least one carbon-carbon double bond. In general, the number of carbon atoms in an alkenyl moiety can be varied as desired (e.g., two to ten carbon atoms, two to six carbon atoms, two to three carbon atoms). An alkenyl moiety can be substituted (e.g., substituted with one or more halogens, substituted with one or more alkyl) or unsubstituted.

As used hereinafter, the term "alkynyl moiety" refers to a hydrocarbon chain having at least one carbon-carbon triple bond. In general, the number of carbon atoms in an alkynyl moiety can be varied as desired (e.g., two to ten carbon atoms, two to six carbon atoms, two to three carbon atoms). An alkynyl moiety can be substituted (e.g., substituted with one or more halogens, substituted with one or more alkyl) or unsubstituted.

As used hereinafter, the term "aryl" refers to a carbon-containing moiety having at least one aromatic ring. For example, an aryl moiety can contain at least one 6-carbon monocyclic aromatic ring and/or at least one 10-carbon bicyclic aromatic ring system. The atoms in the ring of an aryl moiety can be substituted (e.g., substituted with one or more halogens, substituted with one or more alkyl) or unsubstituted.

As used hereinafter, the term "heteroaryl" refers to a carbon-containing moiety that has at least one aromatic ring with at least one non-carbon atom (e.g., O, S, N) in the ring. Examples of heteroaryls include: aromatic 5-8 membered monocyclic rings with at least one O, S and/or N in the ring; 8-12 membered bicyclic rings with at least one O, S and/or N in the ring; and 11-14 membered tricyclic rings with at least one O, S and/or N in the ring. Generally, for monocyclic ring systems, the number of non-carbon atoms in the ring is one, two or three; for bicyclic rings, the number of non-carbon atoms in the ring is one, two, three, four, five or six; for tricyclic rings, the number of non-carbon atoms in the ring is one, two, three, four, five, six, seven, eight or nine.

Embodiments can have one or more of the following features.

In some embodiments, the carbon-containing particles are in the form of a sheet.

In certain embodiments, the moiety is selected from aromatic moieties (e.g., aryl moieties or heteroaryl moieties), halogens, hydrocarbon moieties (e.g., an alkyl moiety, an alkenyl moiety, or an alkynyl moiety), and combinations thereof.

In some embodiments, the moiety includes $-(CH_2)_x(CF_2)_y Ar(\alpha H, \beta X)_z$, wherein x, y, and z are each independently an integer from 0-10; and $Ar(\alpha H, \beta X)$ is an aromatic ring with α hydrogen atoms and β halogen atoms (e.g., fluorine atoms). For example, $Ar(\alpha H, \beta X)$ can be $-C_6F_5$, $-C_6F_4H$, $-C_6F_3H_2$, $-C_6F_2H_3$, or $-C_6FH_4$.

In certain embodiments, the fuel catalyst layer includes a catalyst, such as, for example, platinum or a platinum alloy. In some embodiments, the catalyst is supported by the carbon-containing particles. In certain embodiment, the fuel cell catalyst layer includes from about one weight percent to about 50 weight percent of the catalyst.

In some embodiments, the fuel cell catalyst layer includes a proton conducting material (e.g., a perfluorinated ionomer). In certain embodiments, the fuel cell catalyst layer includes from about five weight percent to about 45 weight percent of the proton conducting material.

In certain embodiments, the fuel cell is a proton-exchange membrane fuel cell, a direct alcohol fuel cell, or a solid oxide fuel cell.

In some embodiments, after chemically reacting the particles with the moiety, a proton conducting material is incorporated into the fuel cell catalyst layer.

In certain embodiments, a catalyst is incorporated into the fuel cell catalyst layer. For example, the catalyst can be incorporated into the fuel cell catalyst layer before the carbon-containing particles are chemically reacted with the moiety, or the catalyst can be incorporated into the fuel cell catalyst layer after the carbon-containing particles are chemically reacted with the moiety.

Embodiments can provide one or more of the following advantages.

In some embodiments, the catalyst layer can exhibit enhanced hydrophobicity. Without wishing to be bound by theory, it is believed that this can increase the ability of the catalyst layer to repel water, which can decrease the likelihood and/or degree of flooding (e.g., when the fuel cell is used at a high current density). This can result in a fuel cell with better performance and relatively long useful lifetime.

In certain embodiments, the fuel cell can generate a very high current density with relatively little (e.g., no) flooding.

Other features and advantages will be apparent from the description, drawings and from the claims.

DETAILED DESCRIPTION

Figure 1:
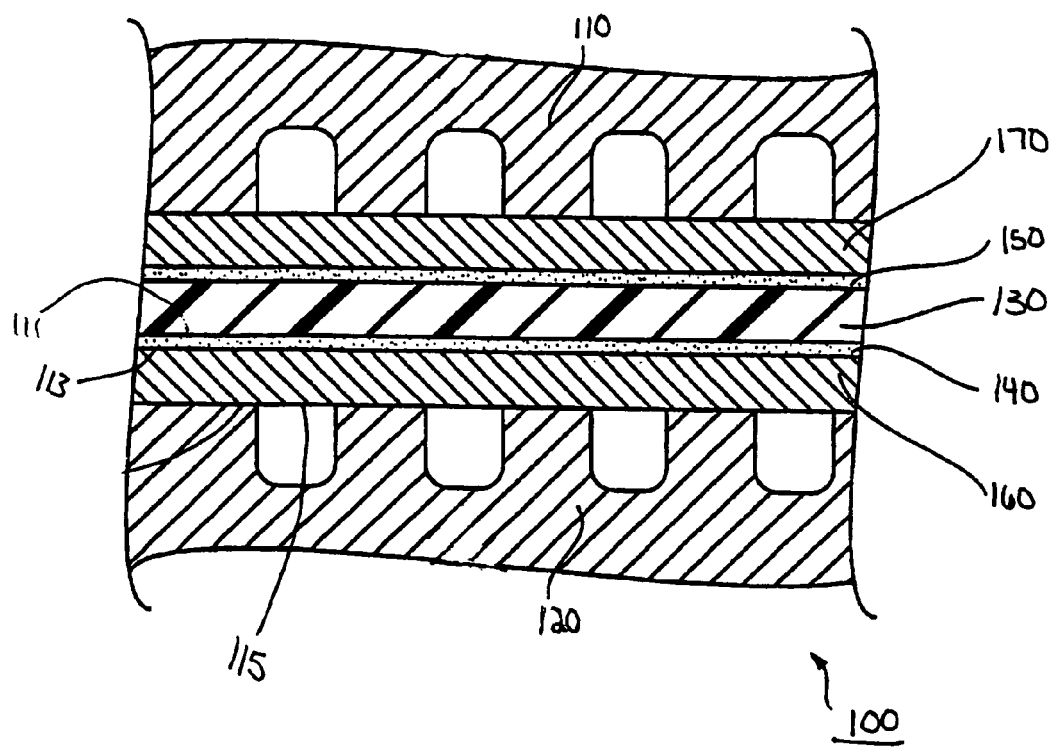
FIG. 1 is a cross-sectional view of an embodiment of a fuel cell.

FIG. 1 shows a fuel cell 100 that includes a cathode flow field plate 110, an anode flow field plate 120, a solid electrolyte 130, catalysts 140 and 150 and diffusion layers 160 and 170.

In general, catalyst layer 140 includes a material capable of interacting with hydrogen to form protons and electrons. Examples of such materials include, for example, platinum, platinum alloys, such as platinum-ruthenium, and platinum dispersed on carbon black. Generally, the catalyst is supported on carbon particles (e.g., carbon black). Layer 140 can include, for example, at least about one weight percent (e.g., at least about five weight percent, at least about 10 weight percent, at least about 15 weight percent, at least about 20 weight percent) catalyst and/or at most about 50 weight percent (e.g., at most about 40 weight percent, at most about 35 weight percent, at most about 30 percent weight percent, at most about 25 weight percent) catalyst.

Optionally, catalyst 140 can further include an electrolyte, such as an ionomeric material (e.g., NAFION) to enhance proton conduction.

In some embodiments, layer 140 is prepared by applying a suspension to the surface of diffusion layer 160 that faces electrolyte 130. In certain embodiments, a catalyst material (e.g., platinum) can be applied to electrolyte 130 using standard techniques. The method of preparing catalyst 140 may further include the use of pressure and temperature to achieve bonding.

Catalyst layer 140 has a hydrophobic moiety covalently bonded thereto (e.g., to surface 111, to surface 113, and/or throughout the entire layer) to increase the hydrophobicity of layer 140. Examples of hydrophobic moieties include aromatic moieties (e.g., aryl moieties, heteroaryl moieties), halogens, and hydrocarbon moieties (e.g., alkyl moieties, alkenyl moieties, alkynyl moieties).

In certain embodiments, the hydrophobic moiety has the following chemical structure:

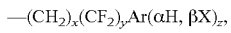

where x, y, and z are greater than or equal to 0. x, y, and z are not simultaneously 0. In some embodiments, $Ar(\alpha H, \beta X)$ is an aromatic ring having $\alpha$ H atoms and $\beta$ halogen atoms, such as, for example, fluorine atoms. In certain embodiments, $Ar(\alpha H, \beta F)$ is $-C_6F_5$, $-C_6F_4H$, $-C_6F_3H_2$, $-C_6F_2H_3$, or $-C_6FH_4$. In general, the hydrophobicity of the moiety covalently bonded to layer 140 can vary. For example, moieties having a greater number of halogen atoms (i.e., higher numbers of y and $\beta$) generally result in moieties having a higher hydrophobicity.

In general, a hydrophobic moiety can be covalently bonded to the carbon particles before or after the catalyst is incorporated into catalyst layer 140.

A hydrophobic moiety can be covalently bonded to the carbon particles in a variety of ways. For example, in some embodiments, an amino compound (e.g., an phenylaniline compound) is reacted with a nitrite compound (e.g., an alkyl nitrite) in the presence of excess acid (e.g., an organic or inorganic acid such as $HBF_4$) to form a diazonium salt (i.e., hydrophobic moiety precursor). The carbon particles are treated with the diazonium salt so that the phenyl moiety is covalently bonded thereto via a carbon-carbon bond (a $C-C_6H_5$ bond).

Typically, anode flow field plate 120 and cathode flow field plate 110 are formed of a carbon material (e.g., graphite, such as porous graphite or nonporous graphite).

Electrolyte 130 should be capable of allowing ions to flow therethrough while providing a substantial resistance to the flow of electrons. In some embodiments, electrolyte 130 is a solid polymer (e.g., a solid polymer ion exchange membrane), such as a solid polymer proton-exchange membrane (e.g., a solid polymer containing sulfonic acid groups). Such membranes are commercially available from E.I. DuPont de Nemours Company (Wilmington, Del.) under the trademark NAFION. Alternatively, electrolyte 130 can also be prepared from the commercial product GORE-SELECT, available from W.L. Gore & Associates (Elkton, Md.).

Generally, diffusion layers 160 and 170 are formed of a material that is gas and/or liquid permeable, allowing reactants and products to pass therethrough. Additionally, diffusion layers 160 and 170 are usually electrically conductive so that electrons can flow from catalysts 140 and 150 to flow field plates 120 and 110, respectively. Layers 160 and 170 can be further treated, for example, by infusing them with polytetrafluoroethylene (e.g., TEFLON®) to enhance hydrophobicity. In general, layers 160 and 170 are made from a layer of carbon (e.g., carbon paper or a carbon sheet).

Catalyst 150 can be formed of a material capable of interacting with oxygen, electrons and protons to form water. Examples of such materials include, for example, platinum, platinum alloys, and noble metals dispersed on carbon black. Catalyst 150 can further include an electrolyte, such as an ionomeric material, e.g., NAFION, that allows the cathode to conduct protons. Catalyst 150 can be prepared as described above with respect to catalyst 140.

Figure 2:
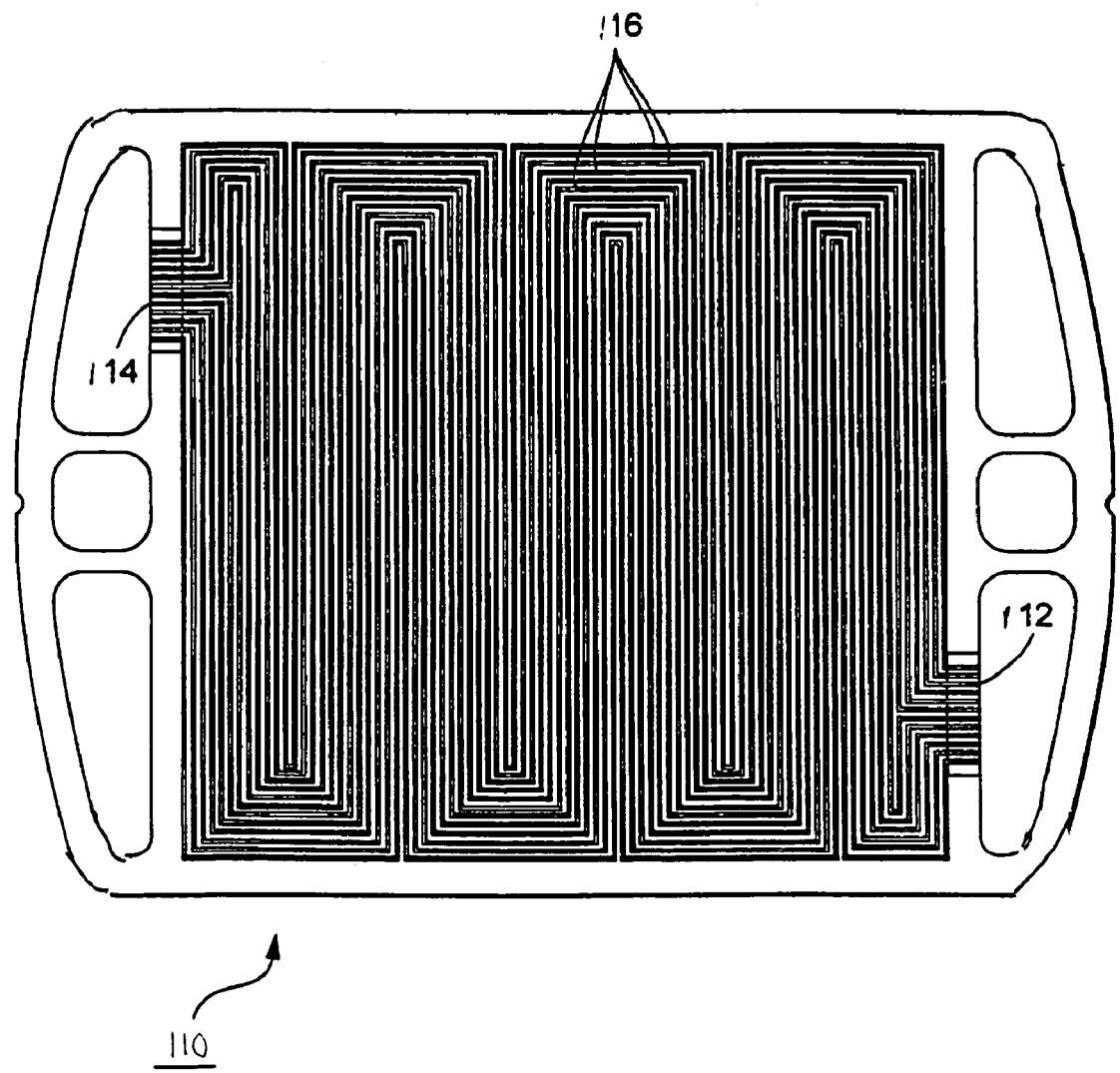
FIG. 2 is an elevational view of an embodiment of an anode flow field plate.

FIG. 2 shows an embodiment of cathode flow field plate 110, which is used to provide a flow path that allows the molecular oxygen to interact with catalyst 150 during use of fuel cell 100. Cathode flow field plate 110 has an inlet 112, an outlet 114 and open-faced channels 116 that define a flow path for an oxidant from inlet 112 to outlet 114. As the oxidant flows along channels 116, the molecular oxygen contained in the oxidant permeates diffusion layer 170 to interact with catalyst 150, electrons and protons to form water. Water can pass back through diffusion layer 170, enter the oxidant stream in channels 116, and exit fuel cell 100 via outlet 114.

Figure 3:
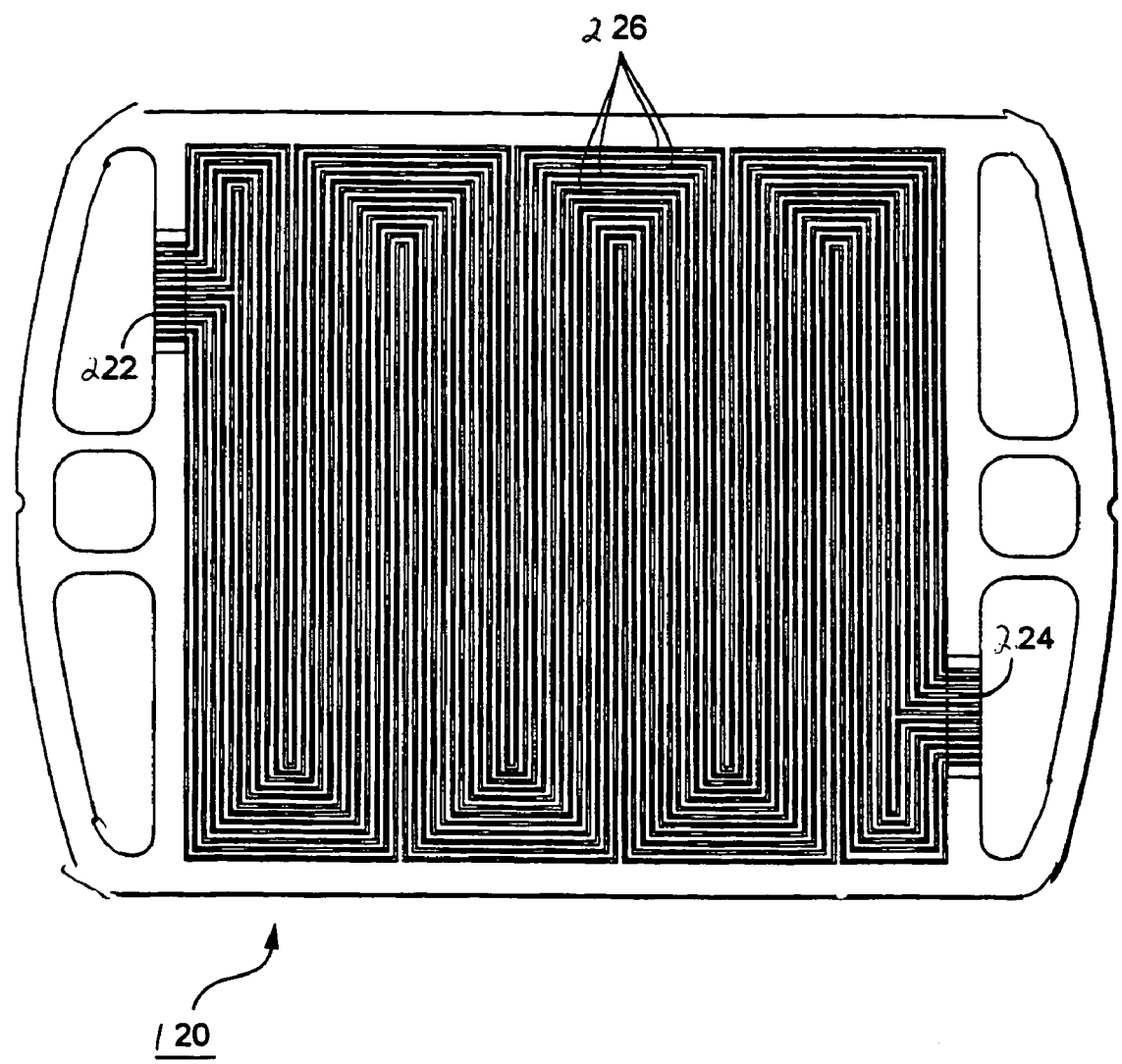
FIG. 3 is an elevational view of an embodiment of a cathode flow field plate.

FIG. 3 shows an embodiment of anode flow field plate 120, which is designed to provide a flow path for a fuel that allows the molecular hydrogen to interact with catalyst 140 during use of fuel cell 100. Anode flow field plate 120 has an inlet 222, outlet 224 and open-faced channels 226 that define a flow path for a fuel from inlet 222 to outlet 224. The protons pass through solid electrolyte 130, and the electrons are conducted through diffusion layer 160 to anode flow field plate 120, flowing through an external load to cathode flow field plate 110 then to cathode diffusion layer 170, and ultimately to cathode catalyst layer 150. The unreacted fuel exits fuel cell 100 via outlet.

Figure 4:
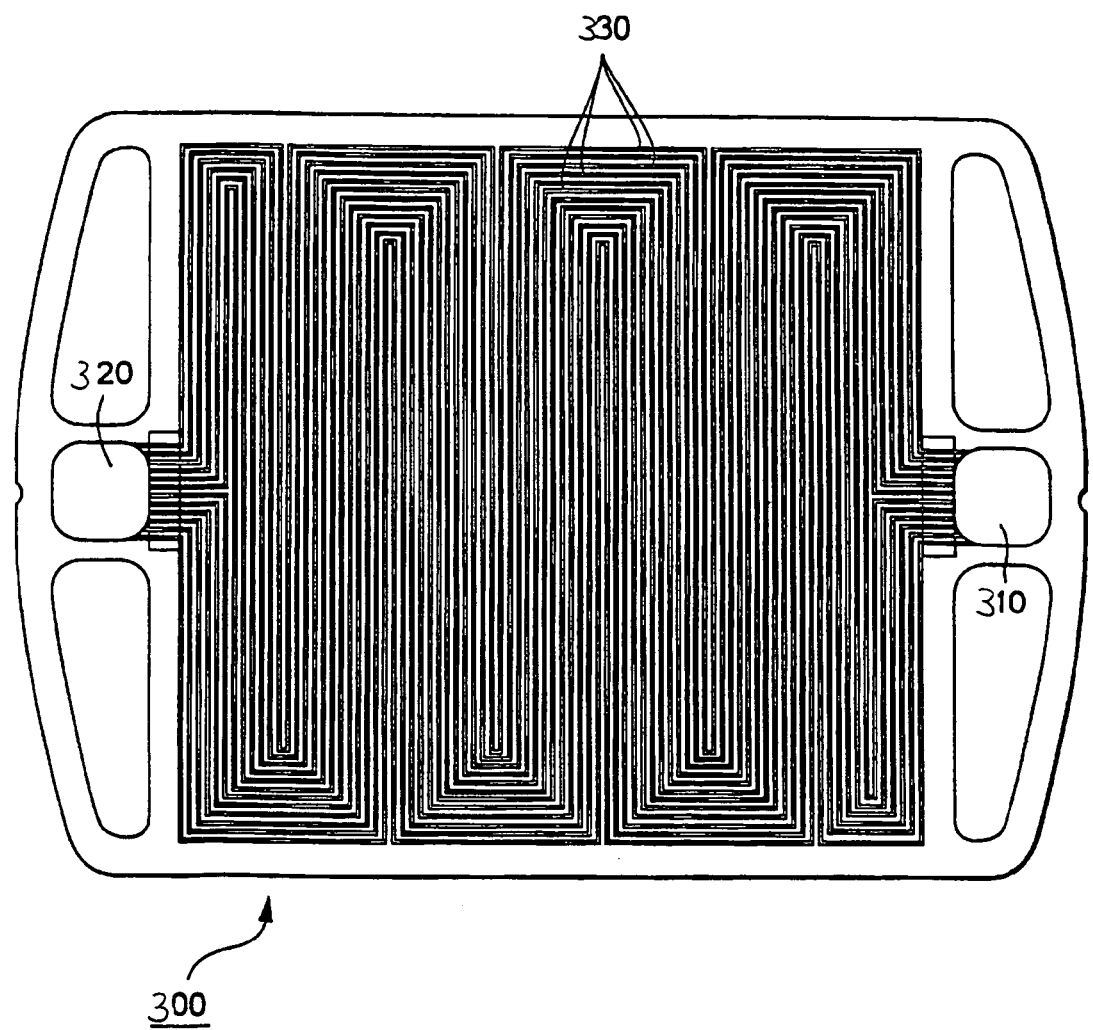
FIG. 4 is an elevational view of an embodiment of a coolant flow field plate.

The heat produced during the fuel cell reaction can be removed by flowing a coolant through the fuel cell via a coolant flow field plate. FIG. 4 shows an embodiment of a coolant flow field plate 300 having an inlet 310, an outlet 320 and open-faced channels 330 that define a flow path for coolant from inlet 310 to outlet 320. The coolant enters fuel cell 100 via inlet 310, flows along channels 330 and absorbs heat, and exits fuel cell 100 via outlet 320.

The following examples are illustrative and not intended to be limiting.

EXAMPLES 5 grams of 20% Pt/Vulcan XC-72 catalyst were added to 10 ml of water and 5 ml of isobutanol containing 3 mmol of 2,3,4,5,6-pentafluoroanailine ($H_2NC_6F_5$). 3 mmol of isobutyl nitrite [$(CH_3)_2CHCH_2ONO$] were added to the mixture, together with 1 gram of tetrafluoroboric acid ($HBF_4$). After stirring for 60 minutes, the mixture was filtered and washed several times. The final product was dried under vacuum. Isobutyl nitrite reacted with the 2,3,4,5,6-pentafluoroanailine to form a diazonium salt under acidic conditions, which then reacted with carbon black through the surface C—H bond to link the —$C_6F_5$ moiety to the carbon surface. Without wishing to be bound by theory, it is believed that the distribution of catalyst particles on the carbon is not expected to be adversely affected by the —$C_6F_5$ moiety. The resulting catalyst is called treated catalyst. The initial catalyst (20% Pt/Vulcan XC-72) is called untreated catalyst.

Two catalyst mixtures were obtained by mixing in one instance the treated catalyst, and in another instance the untreated catalyst, with a Nafion solution at a predetermined Nafion content (which is defined as the weight ration of Nafion (dry weight) to the total weight of both Nafion and the catalyst). After thorough mixing, the mixture was applied onto a diffusion medium such as Toray paper that had been treated with a mixture of carbon black and polytetrafluoroethylene. A membrane-electrode assembly (MEA) was then made by hot-pressing two pieces of electrodes with an active area of 10 $cm^2$ with a Nafion 112 membrane at 130° C.

The MEA was tested in a single cell test fixture. The test fixture was composed of a pair of metal plates with serpentine flow-fields. The plates were coated with a metal nitride for corrosion protection. Rod-like heaters were inserted into the plates to control the cell temperature. Air and pure hydrogen were used as the reactants and their stoichiometries were controlled at approximately 10 times at a current density of 2.0 A/$cm^2$. The gaseous reactants were passed through stainless steel water bottles to get humidified. The test was performed at a cell temperature of 35° C., hydrogen humidication temperature of 45° C., and an air humidiciation temperature of 45° C. (noted hereinafter as 35/45/45° C.).

Figure 5:
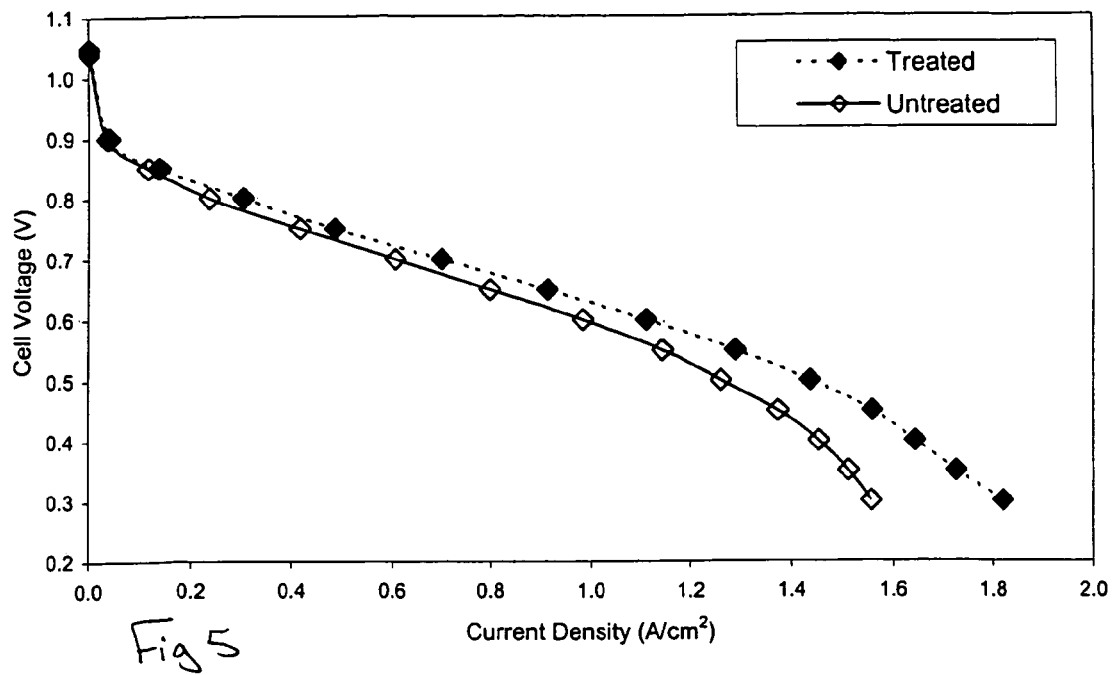
FIG. 5 is a graph depicting a comparison of fuel cell performance of a fuel cell having a catalyst layer with particles treated to form covalent bonds with a hydrophobic moiety and a corresponding untreated catalyst layer.

A comparison of performance of the treated versus untreated catalyst is shown in FIG. 5. As is depicted in FIG. 5, the fuel cell using the treated catalyst performed better than the fuel cell using untreated catalyst over the entire current density region. Without wishing to be bound by theory, it is believed that these results indicate that the utilization of the treated catalyst was higher than that of the untreated catalyst. The largest difference in performance between the treated and untreated fuel cells is seen at the highest current density. Without wishing to be bound by theory, it is believed that the catalyst layer made using the treated catalyst had a smaller mass transport limitation, due to reduced catalyst layer flooding.

Figure 6:
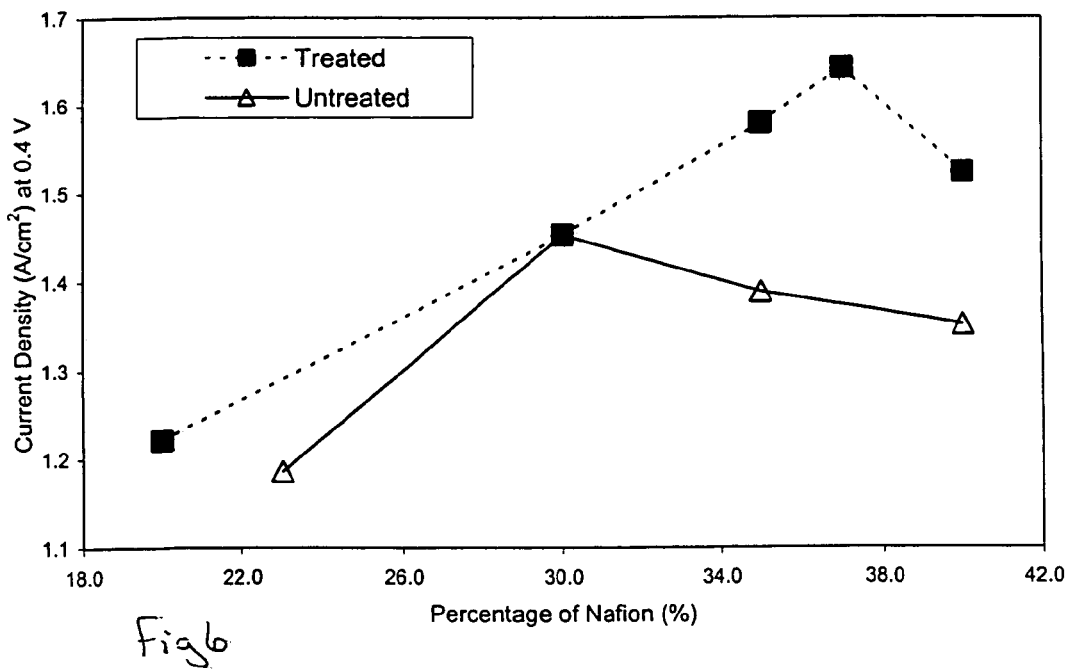
FIG. 6 is a graph depicting the effect of Nafion percentage within the catalyst layer on fuel cell performance.

The effect of Nafion percentage within the catalyst layers made using treated and untreated catalyst is illustrated in FIG. 6. As shown in FIG. 6, when untreated catalyst was used, the optimal Nafion content within the catalyst layer was 30%. However, when the treated catalyst was used, optimal Nafion content shifted to 37%. Without wishing to be bound by theory, it is believed that because the treated catalyst is more hydrophobic, it requires a higher Nafion content within the catalyst layer.

Although the treated catalyst had a higher optimal content of Nafion within the catalyst layer, as illustrated in FIG. 6, it is believed that the treated catalyst layer is less likely to be flooded than a catalyst layer made using untreated catalyst. Without wishing to be bound by theory, this result can be explained by the nature of the catalyst layer flooding. For example, catalyst layer flooding can occur in both the pores as well as on the catalyst surface. If the pores are flooded with water, reactants have to overcome a large resistance to pass through. This sort of flooding is referred to as macroflooding because it happens on a "macro" scale. Additionally, flooding can happen on the surface of the catalyst. This type of flooding is referred to as microflooding as it can happen on a "micro" scale. If a catalyst layer has more Nafion, it is believed that macroflooding is more likely to occur. Without wishing to be bound by theory, it is believed that the macroflooding is more serious when more Nafion was used with the treated catalyst. However, due to the high surface hydrophobicity of the treated catalyst, it is believed the microflooding problem was reduced. Based on the observed performance improvement, it is believed that the reduction of microflooding had greater effect, giving a higher, rather than a lower fuel cell performance, in the fuel cell having the treated catalyst.

Figure 7:
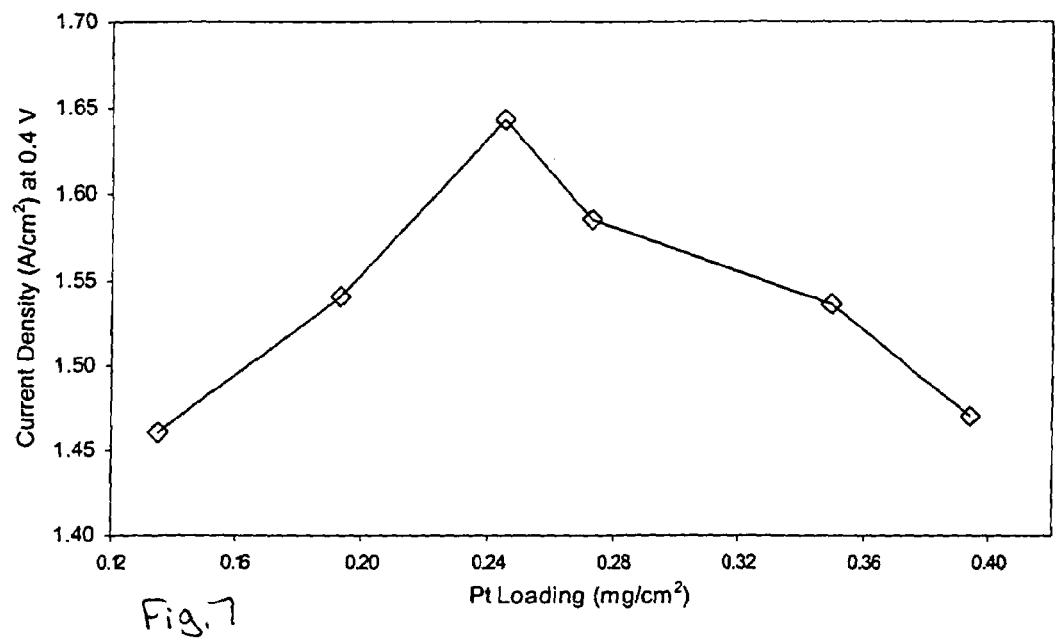
FIG. 7 is a graph depicting the effect of platinum loading in the catalyst layer of a fuel cell on fuel cell performance using treated catalyst.

FIG. 7 is a graph depicting the effect of Pt loading within the catalyst layer on fuel cell performance where the fuel cell has treated catalyst. The current densities at 0.40 are shown as examples. The catalyst loading was changed from 0.135 to 0.396 mg/$cm^2$. The fuel cell performance initially increased with Pt loading, and the highest performance was achieved at a Pt loading of 0.25 mg/$cm^2$. A further increase in Pt loading resulted in lower performance. Without wishing to be bound by theory, it is believed that this result is caused by an increase in catalyst layer resistance and mass transport limitation.

Figure 8:
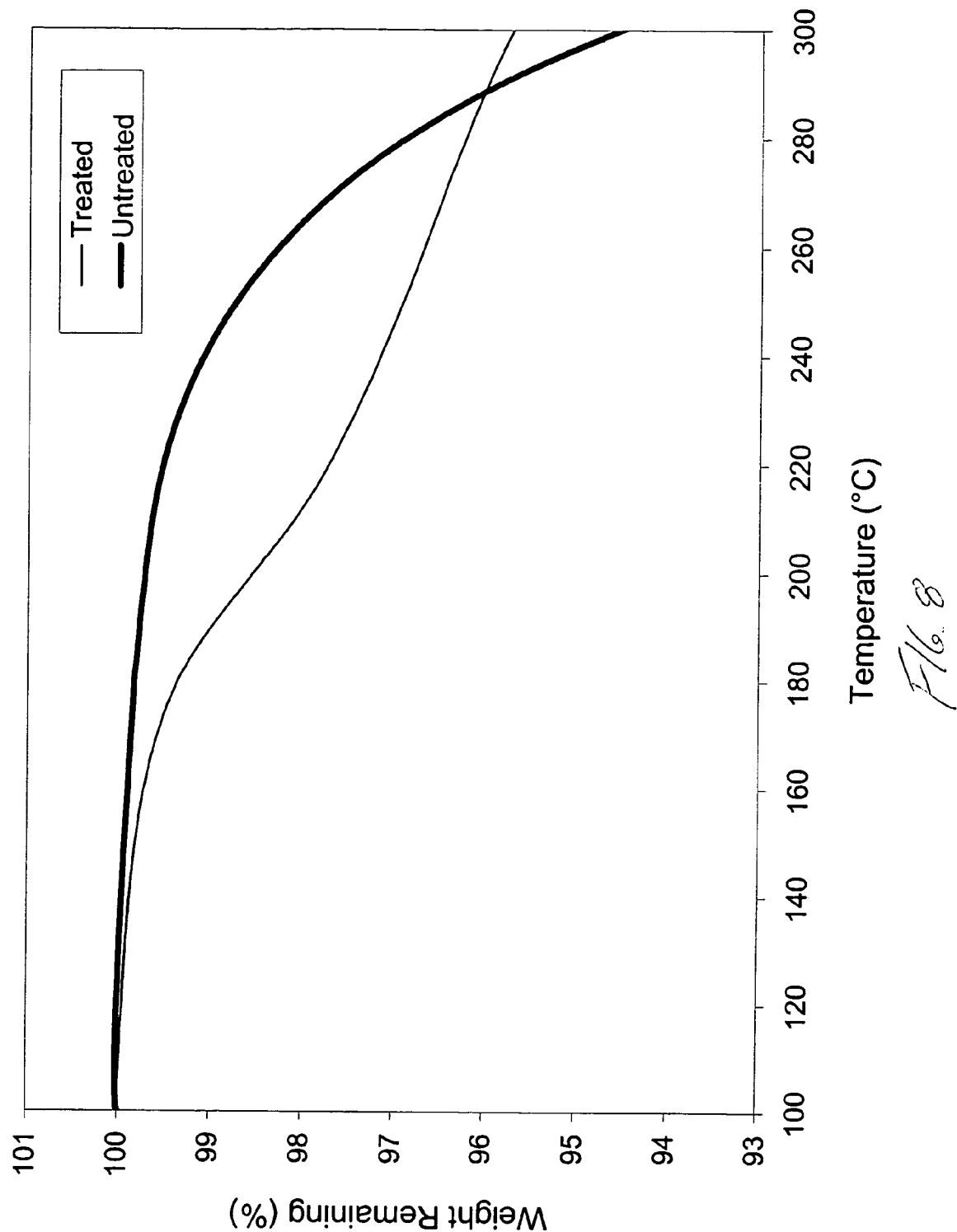
FIG. 8 is a graph comparing the thermal gravimetric analyses of treated and untreated catalysts.

FIG. 8 depicts a graph comparing the thermal gravimetric analysis results of treated and untreated catalysts. The weight loss of catalysts vs. temperature was analyzed using a Perkin-Elmer Thermogravimetric Analyzer (Pyris 6 TGA) in air environment. The temperature was increased at a rate of 5° C. per minute. There was about 1.9% more weight loss for the treated catalyst than for the untreated counterpart at about 230° C. Without wishing to be bound by theory, it is believed that this difference was due to the loss of the hydrophobic moiety from the treated catalyst.

While certain embodiments have been described, other embodiments are possible.

As an example, while embodiments have been described in which one of catalyst layer 150 is covalently bonded to a hydrophobic moiety, in some embodiments, catalyst layer 140 is bonded with a hydrophobic moiety in addition to layer 150 being covalently bonded to a hydrophobic moiety. In certain embodiments, catalyst layer 140 is covalently bonded to a hydrophobic moiety and layer 150 is not bonded to a hydrophobic moiety.

As another example, while embodiments have been described in which a diffusion layer and a catalyst layer are separate layers, in some embodiments, the catalyst material (e.g., a platinum catalyst) can be incorporated into a diffusion layer, along with a hydrophobic moiety.

As a further example, while proton-exchange fuel cells have been described, other fuel cells can also be used. Examples of fuel cells include solid oxide fuel cells and direct-feed liquid fuel cells. Examples of direct-feed liquid fuel cells include direct alcohol fuel cells, such as direct methanol fuel cells, direct ethanol fuel cells and direct isopropanol fuel cells.

The fuel cells can be used in a variety of applications, including, for example, in automobiles or stationary systems (e.g., systems designed to power a home).

Other embodiments are in the claims.

What is claimed is:

1. A fuel cell catalyst layer, comprising:
   carbon-containing particles; and
   a moiety covalently bound to the carbon-containing particles,
   wherein:
   a hydrophobicity of the fuel cell catalyst layer is greater than a hydrophobicity of the carbon-containing particles;
   the moiety comprises $-(CH_2)_x(CF_2)_yAr(\alpha H, \beta X)_z$;
   x, y, and z are each independently an integer from 0-10, wherein x, y, and z are each greater than zero;
   $Ar(\alpha H, \beta X)$ is an aromatic ring with $\alpha$ hydrogen atoms and $\beta$ halogen atoms; and
   at least some of the $\beta$ halogen atoms are fluorine atoms.

2. The fuel cell catalyst layer of claim 1, wherein the carbon-containing particles are in the form of a sheet.

3. The fuel cell catalyst layer of claim 1, wherein the moiety is selected from the group consisting of aromatic moieties, halogens, hydrocarbon moieties, and combinations thereof.

4. The fuel cell catalyst layer of claim 1, wherein the fuel cell catalyst layer comprises a catalyst.

5. The fuel cell catalyst layer of claim 4, wherein the catalyst is supported by the carbon-containing particles.

6. The fuel cell catalyst layer of claim 4, wherein the fuel cell catalyst layer comprises from about one weight percent to about 50 weight percent of the catalyst.

7. The fuel cell catalyst layer of claim 4, wherein the catalyst comprises platinum.

8. The fuel cell catalyst layer of claim 1, further comprising a proton conducting material.

9. The fuel cell catalyst layer of claim 8, wherein the fuel cell catalyst layer comprises from about five weight percent to about 45 weight percent of the proton conducting material.

10. The fuel cell catalyst layer of claim 8, wherein the proton conducting material comprises a perfluorinated ionomer.

11. A fuel cell system, comprising:
    a first fuel cell flow plate;
    a second fuel cell flow plate;
    an electrolyte between the first and second fuel cell flow plates;
    a fuel cell catalyst layer between the first fuel cell flow plate and the electrolyte, the fuel cell catalyst layer comprising:
    carbon-containing particles; and
    a moiety covalently bound to the carbon-containing particles,
    wherein:
    a hydrophobicity of the fuel cell catalyst layer is greater than a hydrophobicity of the carbon-containing particles;
    the moiety comprises $-(CH_2)_x(CF_2)_yAr(\alpha H, \beta X)_z$;
    x, y, and z are each independently an integer from 0-10, wherein x, y, and z are each greater than zero;
    $Ar(\alpha H, \beta X)$ is an aromatic ring with a hydrogen atoms and $\beta$ halogen atoms; and
    at least some of the $\beta$ halogen atoms are fluorine atoms.

12. The fuel cell system of claim 11, wherein the fuel cell is a proton-exchange membrane fuel cell.

13. The fuel cell system of claim 11, wherein the fuel cell is a direct alcohol fuel cell.

14. The fuel cell system of claim 11, wherein the fuel cell is a direct-feed liquid fuel cell.

15. A method of making a fuel cell catalyst layer, the method comprising:
    covalently bonding carbon-containing particles with a moiety to provide the fuel cell catalyst layer,
    wherein:
    the fuel cell catalyst layer has a hydrophobicity greater than a hydrophobicity of the carbon-containing particles;
    the moiety comprises $-(CH_2)_x(CF_2)_yAr(\alpha H, \beta X)_z$;
    x, y, and z are each independently an integer from 0-10, wherein x, y, and z are each greater than zero;
    $Ar(\alpha H, \beta X)$ is an aromatic ring with $\alpha$ hydrogen atoms and $\beta$ halogen atoms; and
    at least some of the $\beta$ halogen atoms are fluorine atoms.

16. The method of claim 15, wherein the carbon-containing particles are in the form of a sheet.

17. The method of claim 15, further comprising, after chemically reacting the particles with the moiety, incorporating a proton conducting material into the fuel cell catalyst layer.

18. The method of claim 15, further comprising incorporating a catalyst into the fuel cell catalyst layer.

19. The method of claim 18, wherein the catalyst comprises platinum.

20. The method of claim 18, wherein the catalyst is incorporated into the fuel cell catalyst layer before the carbon-containing particles are chemically reacted with the moiety.

21. The method of claim 18, wherein the catalyst is incorporated into the fuel cell catalyst layer after the carbon-containing particles are chemically reacted with the moiety.

22. A fuel cell catalyst layer, comprising:
    carbon-containing particles; and
    a moiety covalently bound to the carbon-containing particles,
    wherein:
    a hydrophobicity of the fuel cell catalyst layer is greater than a hydrophobicity of the carbon-containing particles;
    the moiety comprises $-(CH_2)_x(CF_2)_yAr(\alpha H, \beta X)_z$;
    x, y, and z are each independently an integer from 0-10, wherein x, y, and z are each greater than zero;
    $Ar(\alpha H, \beta X)$ is an aromatic ring with $\alpha$ hydrogen atoms and $\beta$ halogen atoms; and
    $Ar(\alpha H, \beta X)$ comprises a moiety selected from the group consisting of $-C_6F_5$, $-C_6F_4H$, $-C_6F_3H_2$, $-C_6F_2H_3$, and $-C_6FH_4$.

23. The fuel cell catalyst layer of claim 22, wherein the carbon-containing particles are in the form of a sheet.

24. The fuel cell catalyst layer of claim 22, wherein the moiety is selected from the group consisting of aromatic moieties, halogens, hydrocarbon moieties, and combinations thereof.

25. The fuel cell catalyst layer of claim 22, wherein the fuel cell catalyst layer comprises a catalyst.

26. The fuel cell catalyst layer of claim 25, wherein the catalyst is supported by the carbon-containing particles.

27. The fuel cell catalyst layer of claim 25, wherein the fuel cell catalyst layer comprises from about one weight percent to about 50 weight percent of the catalyst.

28. The fuel cell catalyst layer of claim 25, wherein the catalyst comprises platinum.

29. The fuel cell catalyst layer of claim 22, further comprising a proton conducting material.

30. The fuel cell catalyst layer of claim 29, wherein the fuel cell catalyst layer comprises from about five weight percent to about 45 weight percent of the proton conducting material.

31. The fuel cell catalyst layer of claim 29, wherein the proton conducting material comprises a perfluorinated ionomer.

32. A fuel cell system, comprising:
a first fuel cell flow plate;
a second fuel cell flow plate;
an electrolyte between the first and second fuel cell flow plates;
a fuel cell catalyst layer between the first fuel cell flow plate and the electrolyte, the fuel cell catalyst layer comprising:
carbon-containing particles; and
a moiety covalently bound to the carbon-containing particles,
wherein:
a hydrophobicity of the fuel cell catalyst layer is greater than a hydrophobicity of the carbon-containing particles;
the moiety comprises $-(CH_2)_x(CF_2)_y Ar(\alpha H,\beta X)_z$;
x, y, and z are each independently an integer from 0-10, wherein x, y, and z are each greater than zero;
$Ar(\alpha H, \beta X)$ is an aromatic ring with $\alpha$ hydrogen atoms and $\beta$ halogen atoms; and
$Ar(\alpha H, \beta X)$ comprises a moiety selected from the group consisting of $-C_6F_5$, $-C_6F_4H$, $-C_6F_3H_2$, $-C_6F_2H_3$, and $-C_6FH_4$.

33. A method of making a fuel cell catalyst layer, the method comprising:
covalently bonding carbon-containing particles with a moiety to provide the fuel cell catalyst layer,
wherein:
the fuel cell catalyst layer has a hydrophobicity greater than a hydrophobicity of the carbon-containing particles;
the moiety comprises $-(CH_2)_x(CF_2)_y Ar(\alpha H,\beta X)_z$;
x, y, and z are each independently an integer from 0-10, wherein x, y, and z are each greater than zero;
$Ar(\alpha H, \beta X)$ is an aromatic ring with $\alpha$ hydrogen atoms and $\beta$ halogen atoms; and
$Ar(\alpha H, \beta X)$ comprises a moiety selected from the group consisting of $-C_6F_5$, $-C_6F_4H$, $-C_6F_3H_2$, $-C_6F_2H_3$, and $-C_6FH_4$.

* * * * *

UNITED STATES PATENT AND TRADEMARK OFFICE
CERTIFICATE OF CORRECTION

PATENT NO. : 7,396,611 B2  Page 1 of 1
APPLICATION NO. : 10/736172
DATED : July 8, 2008
INVENTOR(S) : Xu et al.

It is certified that error appears in the above-identified patent and that said Letters Patent is hereby corrected as shown below:

On the title page, Col. 2 (U.S. Patent Documents), line 5 delete "406/472" and insert -- 106/472 --, therefor.

On the title page, Col. 2 (U.S. Patent Documents), line 18 delete "2005/0074727" and insert -- 2005/0084727 --, therefor.

In Claim 11, Col. 9, line 65, delete "a" and insert -- α --, therefor.

In Claim 22, Col. 10, line 49, delete "βhalogen" and insert -- β halogen --, therefor.

Signed and Sealed this

Ninth Day of September, 2008

JON W. DUDAS
*Director of the United States Patent and Trademark Office*